United States Patent
Uesugi et al.

[11] Patent Number: 5,936,854
[45] Date of Patent: Aug. 10, 1999

[54] DIRECT-CURRENT POWER SUPPLY SYSTEM AND AIR CONDITIONER

[75] Inventors: Michika Uesugi, Fuji; Atsuyuki Hiruma, Fujinomiya, both of Japan

[73] Assignee: Kabushiki Kaisha Toshiba, Kawasaki, Japan

[21] Appl. No.: 09/104,289

[22] Filed: Jun. 24, 1998

[30] Foreign Application Priority Data

Jun. 27, 1997 [JP] Japan ................................. 9-172557
Oct. 21, 1997 [JP] Japan ................................. 9-288861

[51] Int. Cl.$^6$ ................................. H02M 1/14
[52] U.S. Cl. ................. 363/44; 363/52; 363/84; 323/299
[58] Field of Search ................. 363/39, 44, 45, 363/46, 50, 52, 53, 54, 84, 125, 126; 323/299; 318/805, 810, 811

[56] References Cited

U.S. PATENT DOCUMENTS 4,024,444  5/1977  Dewan et al. ........................... 318/810
4,340,931  7/1982  Endo et al. ............................... 363/44

Primary Examiner—Peter S. Wong
Assistant Examiner—Y. J. Han
Attorney, Agent, or Firm—Limbach & Limbach LLP

[57] ABSTRACT

In a direct-current power supply system, an alternating current outputted from an AC power supply is converted by a second diode bridge circuit into a direct current. The direct current is smoothed by voltage doubler capacitors and a smoothing capacitor. A reactor is inserted into an input side of the second diode bridge in series. Detecting circuit is operatively connected to the AC power supply for detecting a zero-crossing point. When the zero-crossing point is detected by the detecting circuit, control means is adapted to firstly switch a switching element on for a first predetermined period of time and, after a predetermined delay period of time has passed since the switching element is firstly switched on, adapted to secondly switch the switching element on for a second predetermined period of time. While the switching element is firstly and secondly switched on, a first diode bridge circuit means is adapted to short-circuit the AC power supply through the reactor so that the AC is forced to flow through the reactor. The rectification means, the short circuit means and the switching element are packaged in one package so that the rectification means, the short circuit means and the switching means are integrated into the one package as one semiconductor module.

17 Claims, 9 Drawing Sheets

DIRECT-CURRENT POWER SUPPLY SYSTEM AND AIR CONDITIONER

BACKGROUND OF THE INVENTION

1. Field of the Invention

The present invention relates to a direct-current power supply system (hereinafter, the system is called a "DC power supply system") for converting an alternating current (AC) supplied from an alternating-current power supply (hereinafter, the system is called an "AC power supply") into a direct current (DC). More particularly, the DC power supply system relates to a system having a reactor inserted into an AC input side of the DC power supply system.

2. Description of Prior Art

In a conventional capacitor-input type DC power supply system, since an input current only flows while an input voltage is larger than a capacitor voltage, that is, "the input voltage>the capacitor voltage" and, there are no elements which limit the input current, the input current gets to be a pulse current having a spike value which is high and having an electrified width which is narrow. To prevent the input current from getting to be the pulse current, a method for inserting a reactor into an input circuit of the capacitor-input type DC power supply system so as to improve a power factor caused between the input current and the input voltage and to restrict a higher harmonic ingredient is previously proposed. However, for getting these effects such that the power factor is improved and the higher harmonic ingredient is restricted, it needs to insert the reactor which has a high inductance. Moreover, when the inductance of the reactor increases, if anything, a degree of a fall of the input voltage is large and a maximum output power of the system falls.

Thus, applicants, for improving a waveform of the input current and the input direct current voltage by using a reactor having a lower inductance, have proposed a DC power supply system for forcibly energizing the reactor so as to improve the power factor and the decrease of the higher harmonic ingredient. Furthermore, applicants also have proposed a method of restricting a vibration noise of the reactor caused by energizing the reactor.

FIG. 6 is an electronic circuit diagram showing an example of this type of a DC power supply system. In this DC power supply system 100, a reactor 102 is inserted in series into one output end of an AC power supply 101, such as a commercial power supply, and so on.

The other end of the reactor 102 is connected to one input end of a first diode bridge 103 consisting of a short circuit and to one input end of a second diode bridge 104 consisting of rectifier circuit.

The first diode bridge 103 is constituted by four diodes (fifth diode D5, sixth diode D6, seventh diode D7 and eighth diode D8). The second diode bridge 104 is constituted by four diodes (first diode D1, second diode D2, third diode D3 and fourth diode D4).

Respective other input ends of the first diode bridge 103 and the second diode bridge 104 are connected to the other output end of the AC power supply 101.

Both output ends of the first diode bridge 103 are connected to a switching element 105, such as a bipolar transistor, MOSFET (Metal Oxide Semiconductor Field Effect Transistor) and so on. In FIG. 6, as the switching element 105, the bipolar transistor is used.

The switching element 105 is connected to control means 106 consisting of a microprocessor or other similar processing unit so as to be gated on and off by the control means 106.

Incidentally, in FIG. 6, referential numeral 107 shows voltage doubler capacitor, referential numeral 108 shows a smoothing capacitor and referential numeral 109 shows a load.

In addition, FIG. 7 is an electronic circuit diagram showing another example of this type of a DC power supply system which has an Insulated Gate Bipolar Transistor (IGBT) 105a as the switching element.

The first diode bridge circuit 103 consisting of the short circuit is adapted to make the IGBT 105a consisting of the switching element 105 control so that the switching element 105 is gated on and off by a gate driver power supply unit 106a consisting of the control means 106 and a drive unit (drive power supply unit).

Remaining elements of the DC power supply system 100a except for the switching element are the same as corresponding elements of the DC power supply system 100. Incidentally, in FIG. 7, the voltage doubler capacitors 107 and the load 109 are omitted.

A predetermined power-factor improvement pulse is supplied from the control means 106 to the switching element 105 for a predetermined period of time since an alternating current voltage of the AC power supply 101 has just passed through each zero points (zero-crossing points) so that the switching element 105 is controlled so as to be gated on and off. According to the ON-OFF control of the switching element 105, both output ends of the AC power supply 101 are short-circuited for a short period of time through the reactor 102 and the first diode bridge 103 so as to forcibly energize the reactor 102. The energy of the reactor 102 causes an enlargement of a conducting period of time (that is, a conducting angle) of the input current of the system. As a result of that, it is possible to improve the power factor of the system and to reduce the higher harmonic ingredient without increasing the inductance of the reactor 102.

Furthermore, in the case where a vibration noise is caused by rapid current change in accordance with forcibly energizing the reactor 102 and cutting off it, by supplying a predetermined noise reduction pulse to the switching element 105 after a predetermined delay period of time since the power-factor improvement pulse is supplied thereto, the short circuit of the reactor 102 is opened so that the vibration noise of the reactor 102 is also decreased.

The AC supplied from the AC power supply system 101 flows through the first diode bridge circuit 103 which is short-circuited by the power-factor improvement pulse for a short period of time and, when the first diode bridge circuit 103 is opened, the AC is switched and flows to the side of the second diode bridge circuit 104. When the first diode bridge 103 is short-circuited by the noise reduction pulse, a discontinuous current including a reverse recovery current of the second diode bridge circuit 104 flows between the first diode bridge circuit 103 and the second diode bridge circuit 104.

FIG. 8 is a wave form chart showing a current value (ampere(A)) of the discontinuous current including the reverse recovery current according to a time (millisecond (MS)) in first short circuit time (T1) at which the first diode bridge circuit 103 is short-circuited and in re-short circuit time at which the first diode bridge circuit 103 is short-circuited again. That is, FIG. 8A is a wave form chart showing a current value (A) of the discontinuous current flowing through the side of the second diode bridge circuit 104 and FIG. 8B is a wave form chart showing a current value (A) of the discontinuous current flowing through the side of the first diode bridge circuit 103.

In addition, FIG. 9(A) is an enlarged wave form chart showing a current value (A) of the discontinuous current in FIG. 8(A) flowing close to the first diode bride 103 and FIG. 9(B) is an enlarged wave form chart showing a current value (A) of the discontinuous current in FIG. 8(B) flowing close to the first diode bride 103.

In the above DC power supply system, the first diode bridge 103, the second diode bridge 104 and the switching element 105 are constructed by different individual semiconductor modules M3, M4 and M5, respectively. Therefore, there are many output terminals of the first diode bridge 103, the second diode bridge 104 and the switching element 105 (the semiconductor modules M3, M4 and M5).

That is, the number of the output terminals of the first diode bridge 103 are four terminals, as shown by small circles of a1~a4 in FIG. 6, the number of the output terminals of the second diode bridge 104 are four terminals, as shown by small circles of b1~b4 therein and the number of the output terminals of the switching element 105 are three terminals, as shown by small circles of c1~c3 therein. So, the sum of the terminals of the first diode bridge 103, the second diode bridge 104 and the switching element 105 is eleven terminals. For this reason, an efficiency of an assembly operation including connection operations of each of the first diode bridge 103, the second diode bridge 104 and the switching element 105 is lowered, and the reliability thereof is reduced.

Moreover, in the first diode bridge 103, the second diode bridge 104 and the switching element 105, radiating means for radiating heat therein are individually and respectively provided. These respective radiating means are constructed so as to correspond to these respective electrical rated value of the first diode bridge 103, the second diode bridge 104 and the switching element 105, respectively. That is, since in the above DC power supply system it must be provided with the plurality of radiating means, it is disturbed to make the DC power supply system small-sized and light.

Furthermore, a path, through which the discontinuous current caused by the switching operation of the switching element 105 and the reverse recovery current shaped as a spike and caused by the short circuit of the noise reduction pulse flow, is shown in FIG. 6 such that the discontinuous current and the reverse current flow through a first diode D1 of the second diode bridge circuit 104, a fifth diode D5 of the first diode bridge circuit 103, the switching element 105 and a eighth diode D8 (a first diode D1 of the second diode bridge circuit 104→a fifth diode D5 of the first diode bridge circuit 103→the switching element 105→an eighth diode D8). Since the discontinuous current and the reverse current flow between the semiconductor module M3, M4 and M5, electromagnetic wave noise radiated to an outside portion of these respective modules M3, M4 and M5 is increased.

SUMMARY OF THE INVENTION

The present invention is directed to overcome the foregoing problems. Accordingly, it is an object of the present invention to provide a DC power supply unit which has a high efficiency of an assembly operation, little electromagnetic wave noise, a small size and light weight, making it possible to improve a reliability of the DC power supply unit and to be easy to handle the DC power supply unit.

In order to achieve such object, according to one aspect of the present invention, there is provided a direct-current power supply system comprising an alternating current power supply for outputting an alternating current, rectification means for converting the alternating current outputted from the alternating current power supply into a direct current, smoothing means for smoothing the direct current outputted from the rectification means, a reactor inserted into an input side of the rectification means in series, zero-crossing detecting means operatively connected to the alternating current power supply for detecting a zero-crossing point at which an alternating current volt of the alternating current power supply has just passed through a zero point, control means having a switching element, when the zero-crossing point is detected by the zero-crossing detecting means, adapted to firstly switch the switching element on for a first predetermined period of time and, after a predetermined delay period of time has passed since the switching element is firstly switched on, adapted to secondly switch the switching element on for a second predetermined period of time, said second predetermined period of time being shorter than the first predetermined period of time, short circuit means, while the switching element is firstly and secondly switched on, adapted to short-circuit the alternating current power supply through the reactor so that the alternating current is forced to flow through the reactor, and one package for packaging at least said rectification means, said short circuit means and said switching element therein so that at least said rectification means, said short circuit means and said switching means are integrated into the one package as one semiconductor module.

In a preferred embodiment of this aspect, the one semiconductor module has two alternating current input terminals connected to two output ends of the alternating current power supply, two direct current output terminals connected to the smoothing circuit and two control signal input terminals connected to the control means.

This aspect of the invention has an arrangement that the entire control means is integrated into the one semiconductor module.

This aspect of the invention has an arrangement that the semiconductor module has one short circuit input terminal for inputting the alternating current flowing through the reactor to the short circuit means and said reactor has one terminal connected to one output end of the alternating current power supply and other terminal, and further comprising a fuse inserted between the one short circuit input terminal of the semiconductor module and the other terminal of the reactor.

In a preferred embodiment of this aspect, the fuse has a first rated current value, and further comprising a fuse element inserted between the one output end of the alternating current power supply and the one terminal of the reactor and having a second rated current value, said second rated current value of the fuse element being larger than the first rated current value of the fuse.

For achieving such object, according to another aspect of the present invention, there is provided a direct-current power supply system comprising an alternating current power supply for outputting an alternating current, rectification means having a diode bridge unit including a diode for converting the alternating current outputted from the alternating current power supply into a direct current by the diode bridge circuit, smoothing means for smoothing the direct current outputted from the rectification means, a reactor inserted into an input side of the rectification means in series, zero-crossing detecting means operatively connected to the alternating current power supply for detecting a zero-crossing point at which an alternating current volt of the alternating current power supply has just passed through a zero point, control means having a switching element, when the zero-crossing point is detected by the zero-crossing detecting means, adapted to firstly switch the switching element on for a first predetermined period of time and, after a predetermined delay period of time has passed since the switching element is firstly switched on, adapted to secondly switch the switching element on for a second predetermined period of time, said second predetermined period of time being shorter than the first predetermined period of time, and short circuit means having a diode bridge circuit including a diode, while the switching element is firstly and secondly switched on, adapted to short-circuit the alternating current power supply through the reactor and the diode bridge circuit so that the alternating current is forced to flow through the reactor, wherein said diode of the diode bridge circuit of the short circuit means is adapted to be commonly used as the diode of the diode bridge unit of the rectification means.

In a preferred embodiment of this aspect, the diode bridge circuit has four diodes, said diode bridge unit has two diodes, and wherein said commonly used diode of the diode bridge circuit is two diodes of the diode bridge circuit and has cathode side terminals, said cathode side terminals of the two commonly used diodes being commonly connected to anode side terminals of other two diodes of the diode bridge circuit and to anode side terminals of two diodes of the diode bridge unit, respectively.

This aspect has an arrangement that further comprises one package for packaging at least said rectification means and said short circuit means therein so that at least said rectification means and said short circuit means are integrated into the one package as one semiconductor module.

For the purpose of achieving such object, according to a further aspect of the present invention, there is provided an air conditioner having a compressor and a compressor motor for driving the compressor for executing an air conditioning operation according to a drive of the compressor; the air conditioner comprising converter means for converting an alternating current into a direct current, and inverter means for converting the direct current converted by the converter means into a variable alternating current having a variable voltage and a variable frequency so as to supply the variable alternating current to the compressor motor, wherein said converter means comprises an alternating current power supply for outputting the alternating current, rectification means for converting the alternating current outputted from the alternating current power supply into the direct current, smoothing means for smoothing the direct current outputted from the rectification means so as to transmit the smoothed direct current to the inverter means, a reactor inserted into an input side of the rectification means in series, zero-crossing detecting means operatively connected to the alternating current power supply for detecting a zero-crossing point at which an alternating current volt of the alternating current power supply has just passed through a zero point, control means having a switching element, when the zero-crossing point is detected by the zero-crossing detecting means, adapted to firstly switch the switching element on for a first predetermined period of time and, after a predetermined delay period of time has passed since the switching element is firstly switched on, adapted to secondly switch the switching element on for a second predetermined period of time, said second predetermined period of time being shorter than the first predetermined period of time, short circuit means, while the switching element is firstly and secondly switched on, adapted to short-circuit the alternating current power supply through the reactor so that the alternating current is forced to flow through the reactor, and one package for packaging at least said rectification means, said short circuit means and said switching element therein so that at least said rectification means, said short circuit means and said switching means are integrated into the one package as one semiconductor module.

In these aspects of the present invention, since, the rectification means, the short circuit means and the switching element are packaged together in the one package so that the rectification means, the short circuit means and the switching element are integrated into the one semiconductor module, it is possible to reduce the number of packages of the direct-current power supply system of the present invention, which needs only one package, as compared with that of the conventional direct-current power supply system, which needs at least three packages. Therefore, it is possible to miniaturize the direct-current power supply system of the present invention, to make the direct-current power supply system thereof light weight and to reduce the number of the output terminals of the package of the direct-current power supply system of the present invention as compared with that of the conventional direct-current power supply system. As a result of that, it is possible to improve the efficiency of the connecting operations when the output terminals of the package are connected to outside components thereby improving the assembly operation of the direct-current power supply system of the present invention, which includes the connecting operations.

Moreover, since the one package is common to individual packages of the rectification means, the short circuit means and the switching element, it is possible to arrange adjacently the rectification means, the short circuit means and the switching element through no individual packages and connect them. This causes a length of the connection route between the rectification means, the short circuit means and the switching element and an area of the connection route therebetween to reduce, thereby decreasing a floating capacitance and an inductance caused by the connecting route so as to improve the reliability of the direct-current power supply system of the present invention.

Furthermore, in a case where the supplementary discontinuous current and the reverse recovery current of the rectification means caused by the ON control (short circuit control) flow so as to produce the high-frequency noise (electromagnetic wave noise), in this direct-current power supply system of the present invention, by arranging adjacently the rectification means, the short circuit means and the switching element through no individual packages and connect them in the one package, it is possible to reduce the high-frequency noise emitted from the path through which the discontinuous current and the reverse recovery current toward the exterior thereof.

BRIEF DESCRIPTION OF THE DRWAWINGS

Other objects and aspects of the invention will become apparent from the following description of embodiments with reference to the accompanying drawings in which.

DETAILED DESCRIPTION OF THE PREFERRED EMBODIMENTS

Figure 1:
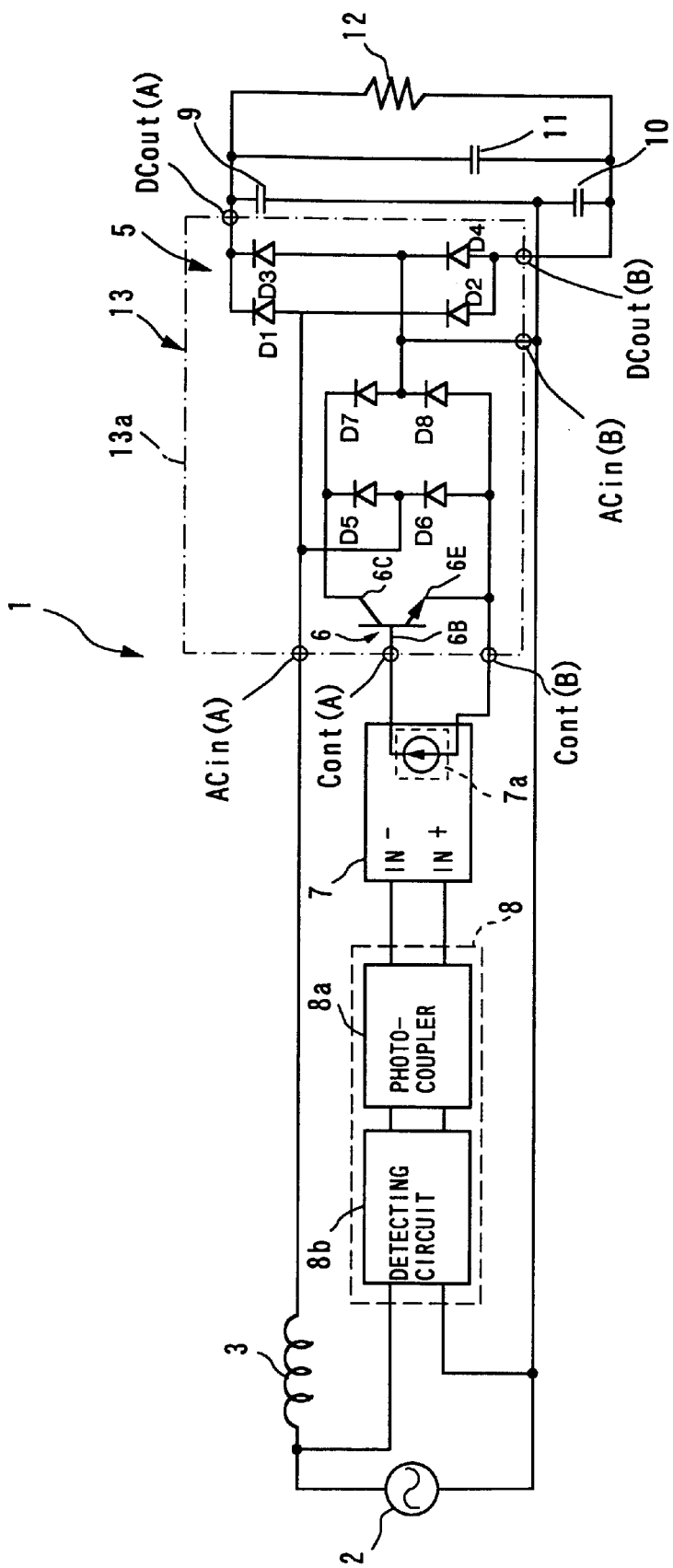
FIG. 1 is an electronic circuit diagram showing a DC power supply system according to a first embodiment of the present invention.

The embodiments of the present invention will now be described with reference to FIG. 1~FIG. 6. Incidentally, same reference characters are assigned to elements in these figures, which are substantially equal each other.

FIG. 1 is an electronic circuit diagram showing a DC power supply system 1 according to a first embodiment of the invention. The DC power supply system 1 has an AC power supply 2, such as a commercial power supply, and so on. A reactor 3 having one terminal is connected through the one input terminal to one output end of the AC power supply 2 in series. The other terminal of the reactor 3 is connected to one input end (terminal) ACin(A) of a first diode bridge 4 which is constituted by four diodes D5~D8. These four diodes D5~D8 of the first diode bridge 4 have one same conducting direction, respectively. The other terminal of the reactor 3 is also connected to one input end of a second diode bridge 5 consisting of a full wave rectifier. The second diode bridge 5 is constituted by four diodes D1~D4. The other input end (terminal) ACin(B) of the first diode bridge 4 and other input end of the second diode bridge 5 are connected to other output ends of the AC power supply 2.

The DC power supply system 1 also has a switching element 6 which is composed of a semi-conductor element, such as a bipolar transistor, an Insulated Gate Bipolar Transistor (IGBT), a MOSFET (Metal Oxide Semiconductor Field Effect Transistor) and so on. In FIG. 1, as the switching element 6, the bipolar transistor is used. The switching element (bipolar transistor) 6 has an emitter (an emitter electrode) 6E, a base (a base electrode) 6B and a collector (a collector electrode) 6C. The first diode bridge 4 has two output ends (terminals) both of which are connected to the collector 6C and the emitter 6E. When the switching element 6 is gated on, both output ends of the AC power supply 2 are short-circuited through the first diode bridge 4 and the reactor 3.

The gate 6B of the switching element 6 having a terminal (Cont(A)) is connected to a control means 7 having, for example, a drive power supply unit 7a, which consists of a microprocessor or other similar processing unit. One output terminal (Cont(B)) of the switching element 4 is connected to the control means 7. The switching element 6 is controlled so as to be gated on and off by the control signal of the control means 7, which is inputted through the terminals Cont(A), Cont(B) to the switching element 6.

In an input side of the control means 7, zero-crossing detecting means 8 consisting of a photocoupler 8a, a current-transformer (not shown), a detecting circuit 8b and other elements is provided. The detecting circuit 8b of the detecting means 8 is connected through the photocoupler 8b to the input side of the control means 7 in a manner of insulating connection. The zero-crossing detecting means 8 has input side ends both of which are connected to the output ends of the AC power supply 2. The zero-crossing detecting means 8 is adapted to detect a point of time at which an alternating current voltage of the AC power supply 2 has just passed through a zero point (zero volt), that is zero-crossing point, to output a detecting signal according to the detection of the point of time and to supply the detecting signal to the control means 7.

The control means 7 is operative to supply a power-factor improvement pulse to the switching element 6 for a predetermined ON period of time since the alternating current volt has just passed through the zero-crossing point and to supply a noise reduction pulse to the switching element 6 having a pulse width which is narrower than that of the power-factor improvement pulse after a predetermined delay period of time since the power-factor improvement pulse is supplied thereto.

The power-factor improvement pulse is a pulse, for improving the power factor and reducing the higher harmonic ingredient, which is outputted for a predetermined period of time from each zero-crossing point of each wave form AC of the alternating current volt of the AC power supply 2 (for example, several milliseconds). The noise reduction pulse is a pulse, for reducing the vibration noise caused by rapid current change according to forcibly energizing the reactor 3, which is supplied to the switching element 6 after a predetermined delay period of time since the power-factor improvement pulse is supplied thereto.

A most suitable value of the delay period of time of the respective noise reduction pulses with respect to the respective power-factor improvement pulses and a most suitable value of the predetermined ON period of time of the respective noise reduction pulses are substantially one-sixth of a wavelength of a natural frequency of the reactor 3, respectively, for example very short time like substantially 20 µsec.

Output ends (terminals) DCout(A), DCout(B) of the second diode bridge circuit 5 are connected through voltage doubler capacitors 9, 10 and a smoothing capacitor 11 to a load (load resistance) 12. Therefore, the alternating current voltage of the AC power supply 2 is doubled and rectified by the second diode bridge circuit 5 and the voltage doubler capacitors 9, 10 so that a maximum value of an output voltage from the voltage doubler capacitors 9, 10 is substantially double of the alternating current voltage of the AC power supply 2. The terminal voltage of the voltage doubler capacitors 9, 10 are so smoothed by the smoothing capacitor 11 as to get to be a direct current voltage. The direct current voltage is applied to the load 12.

Therefore, when the alternating current voltage is outputted from the AC power supply 2, the alternating current voltage is supplied through the reactor 3 to a voltage doubler rectifier circuit constituted by the second diode bridge circuit 5, the voltage doubler capacitors 9, 10 and the smoothing capacitor 11 so as to get to be the direct current voltage and the direct current voltage is applied to the load 12. When the alternating current voltage has just passed through the zero-crossing point OX, the passage of the alternating current voltage through the zero-crossing point OX is detected by the zero-crossing detecting means 8 thereby outputting the detecting signal to the control means 7 whereby to drive the control means 7.

According to the detecting signal, the control means 7 produces the power-factor improvement pulse and the noise reduction pulse so as to provide those to the switching element 6 for a predetermined period of time after the passage of the alternating current voltage through the zero-crossing point OX.

The switching element 6 is gated ON in response to the power-factor improvement pulse and the noise reduction pulse. That causes both output ends of the AC power supply 2 through the first diode bridge circuit 4 and the reactor 3 to short-circuit. According to the short circuit of the AC power supply 2, the switching element 6 makes the AC power supply 2 short-circuit through the reactor 3 so that the input current flows through the reactor 3 while the input voltage is not only larger than the capacitor voltage but also smaller than the capacitor voltage, that is, "the input voltage<the capacitor voltage" so as to store an electric energy. As a result of that, the conducting period of time (that is, the conducting angle) of the input current of the AC power supply 2 is enlarged, making it possible to improve the power factor of the DC power supply system 1 and to reduce the higher harmonic ingredient.

In addition, when the switching element 6 is gated ON in response to the noise reduction pulse, after the reactor 3 is short-circuited by the power-factor improvement pulse, the short circuit of the reactor 3 is opened so as to reduce the vibration noise caused by the short circuit current which is rapidly so changed as to be turned OFF.

Then, in this embodiment, the first diode bridge circuit 4, the second diode bridge circuit 5 and the switching element 6 are packaged together in one package 13a so that these three circuits 4, 5 and 6 are integrated into one semiconductor module 13.

That is, a conventional DC power supply system used to need at least three packages for packaging the three circuits, respectively. However, the DC power supply system of this embodiment of the present invention has only one package 13a for packaging three circuits 4, 5 and 6 so that the number of packages of this embodiment is reduced as compared with that of the conventional DC power supply system by two packages and over. Therefore, it is possible to miniaturize the DC power supply system 1 and to make the DC power supply system 1 light weight.

Moreover, since the package 13a is common to individual packages of the first diode bridge circuit 4, the second diode bridge circuit 5 and the switching element 6, it is possible to arrange adjacently the first diode bridge circuit 4, the second diode bridge circuit 5 and the switching element 6 through no individual packages and connect them. This causes a length of the connection route between these circuits 4, 5 and 6 and an area of the connection route therebetween to reduce, thereby decreasing a floating capacitance and an inductance caused by the connecting route so as to improve the reliability of the DC power supply system 1.

Furthermore, in the conventional DC power supply system, the supplementary discontinuous current and the reverse recovery current of the second diode bridge circuit 5 caused by the ON control (short circuit control) flow so as to produce the high-frequency noise (electromagnetic wave noise). However, in this embodiment, by arranging adjacently the first diode bridge circuit 4, the second diode bridge circuit 5 and the switching element 6 through no individual packages and connect them in the package 13a, it is possible to reduce the high-frequency noise emitted from the path through which the discontinuous current and the reverse recovery current toward the exterior thereof.

In addition, since one package 13a is common to individual packages of the first diode bridge circuit 4, the second diode bridge circuit 5 and the switching element 6, it is possible to attach the minimum output terminals, which consist of the two AC input terminals ACin(A), ACin(B), two DC output terminals DCout(A), DCout(B) and two control signal input terminals Cont(A), Cont(B), as shown by small circles in FIG. 1, to the package 13a.

Figure 6:
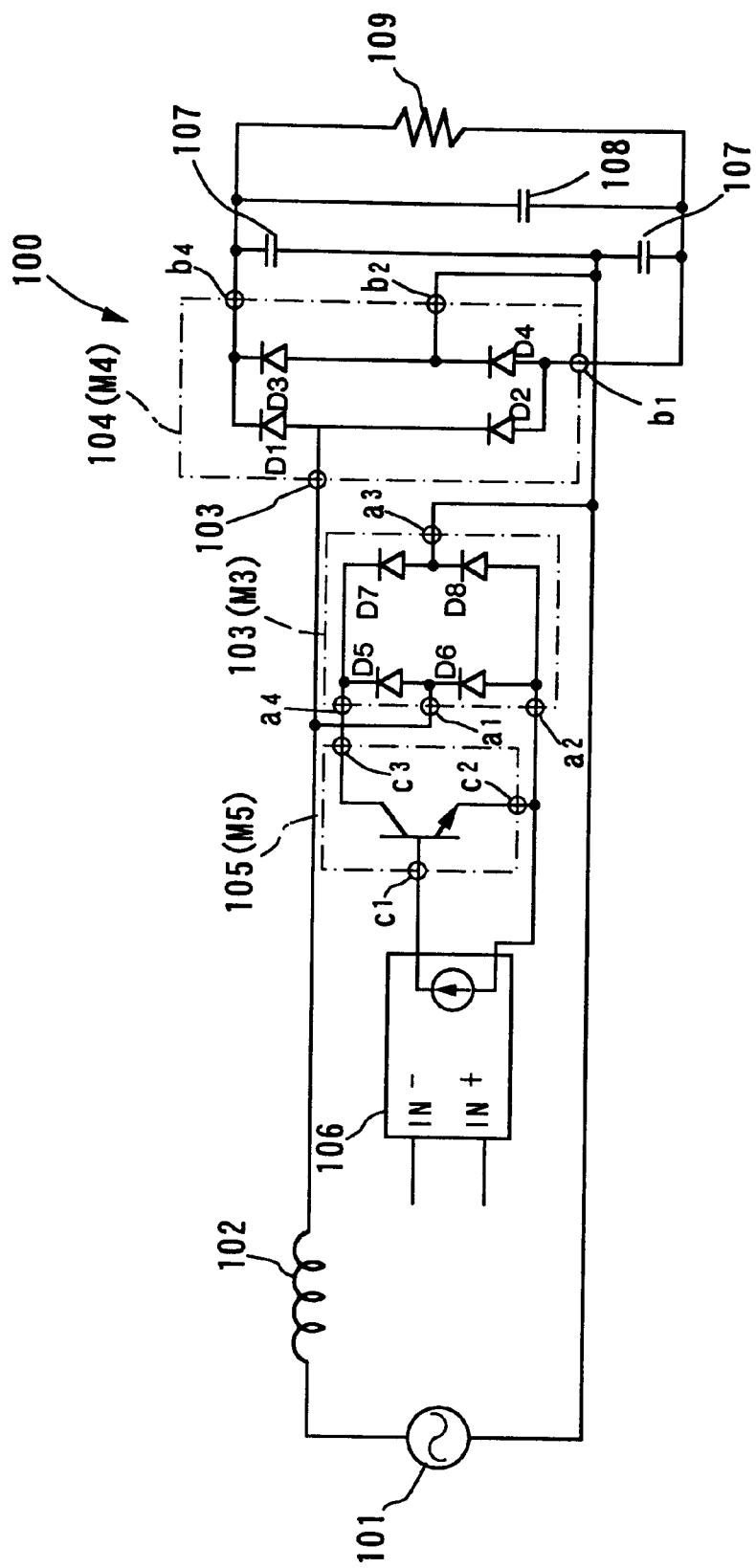
FIG. 6 is an electronic circuit diagram showing an example of a conventional DC power supply system.

That is, the sum of the output terminals of the package 13a consisting of the two terminals ACin(A), ACin(B), two DC terminals DCout(A), DCout(B) and two terminals Cont(A), Cont(B) is six terminals. Therefore, the number of the output terminals of the common package 13a (semiconductor module 13) of this embodiment, which are six terminals, are reduced as compared with that of the three individual packages (semiconductor modules M3, M4 and M5; as shown in FIG. 6), which are eleven terminals.

As a result of that, it is possible to reduce connecting portions between the six output terminals of the package 13a and outside components, such as the AC power supply 2, the reactor 3 and so on, thereby improving the efficiency of the assembly operation including the connecting operations of the DC power supply system 1 and the reliability thereof and saving a packaging space of the semiconductor module.

Moreover, since an outside component, such as the detecting means 8, is connected through the photocoupler 8a to the input side of the control means 7, the control means 7 is insulated from the detecting means 8 so as to prevent the control means 7 from making an incorrect operation by the electromagnetic wave noise.

Figure 2:
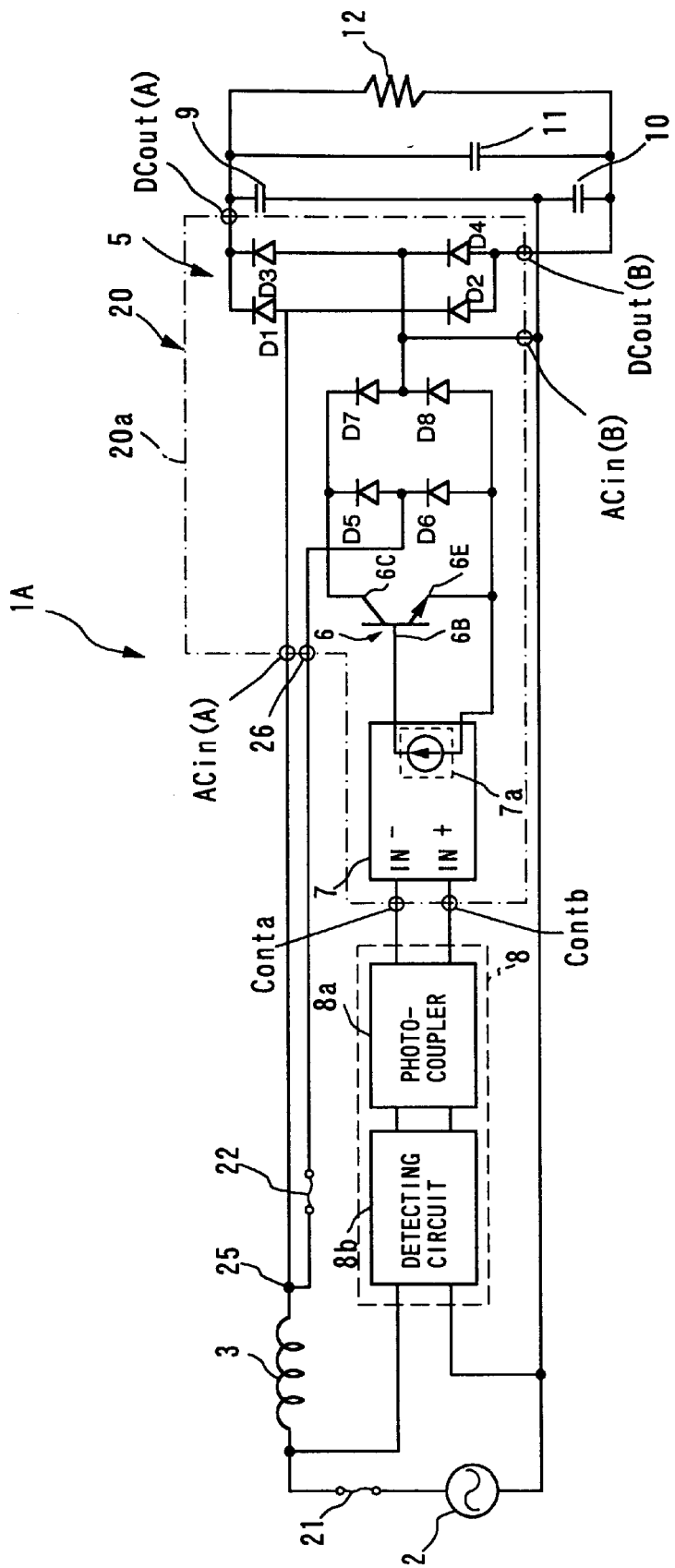
FIG. 2 is an electronic circuit diagram showing a DC power supply system according to a second embodiment of the present invention.

FIG. 2 is an electronic circuit diagram showing a DC power supply system 1A according to a second embodiment of the invention.

This DC power supply system 1A of this embodiment has a feature in that the first diode bridge circuit 4, the second diode bridge circuit 5, the switching element 6, and, in addition to them, the control means 7 including a drive power supply unit 7a for driving the switching element 6 are packaged together in the one package 20a so that these four circuits 4, 5, 6 and 7 are integrated into the one semiconductor module 20. Moreover, the DC power supply system 1A of this embodiment has another feature in that the DC power supply system 1A is provided with a main-fuse 21 and a sub-fuse 22. The remaining components of the DC power supply system 1A of the second embodiment are substantially the same as corresponding components of the DC power supply system 1 of the first embodiment, respectively.

In stead of the two input terminals Cont(A), Cont(B) of the first embodiment, the one package 20a has two detecting signals, input terminals Conta, Contb, attached thereto for inputting the detecting signal detected by the detecting means 8 into the control means 7.

The main-fuse 21 is inserted between the one output end of the AC power supply 2 and the one terminal of the reactor 3 in series and the sub-fuse 22 is inserted between the other terminal 25 of the reactor 3 and the one short circuit input terminal 26 of the first diode bridge circuit 4 (the package 20a) for inputting the AC flowing through the reactor 3. The one short circuit input terminal 26 is operative to input the AC flowing through the reactor 3 and the other terminal 25. A rated current value of the main-fuse 21 is larger than that of the sub-fuse 22. The one short circuit input terminal 26 is an outside terminal for only inputting through the reactor 3 the AC supplied from the AC power supply 2 into one of the first diode bridge circuit 4.

Therefore, in the DC power supply system 1A of this embodiment, since the control means 7 is arranged adjacently to the first and second diode bridge circuits 4, 5 and the switching element 6 in the single common package 20a and connected thereto, it is possible to miniaturize the DC power supply system 1A and to reduce a length of the connection route in the package 20a and an area of the connection route therein. As a result of that, a floating capacitance and an inductance caused by the connecting route is decreased so as to improve the reliability of the DC power supply system 1A, as well as reduce the electromagnetic wave noise.

Furthermore, the control means 7 has the drive power supply unit 7a, by connecting the outside component, such as the detecting means 8, to the input side of the control means 7, making it possible to simply control the detecting means 8.

In addition, in case the switching element 6 gets out of order, the sub-fuse 22 has burned out, making it possible to prevent the first diode bridge circuit 4 consisting of the short circuit from getting out of order. In case the sub-fuse 22 has burned out, because the rated current value of the main-fuse 21 is larger than that of the sub-fuse 22, it is possible to uninterruptedly supply through the reactor 3 the AC supplied from the AC power supply 2 into the second diode bridge circuit 5 consisting of the rectifier circuit so as to drive the DC power supply system 1A.

Moreover, in case an eddy current is outputted from the AC power supply 2, since the main-fuse 21 has burned out, it is possible to prevent the eddy current from outputting so as to prevent circuit components of the DC power supply system 1A, which are arranged in an output side of the reactor 3, for example, the second diode bridge circuit 5, from occurring the breakdown of the circuit components thereof.

Figure 3:
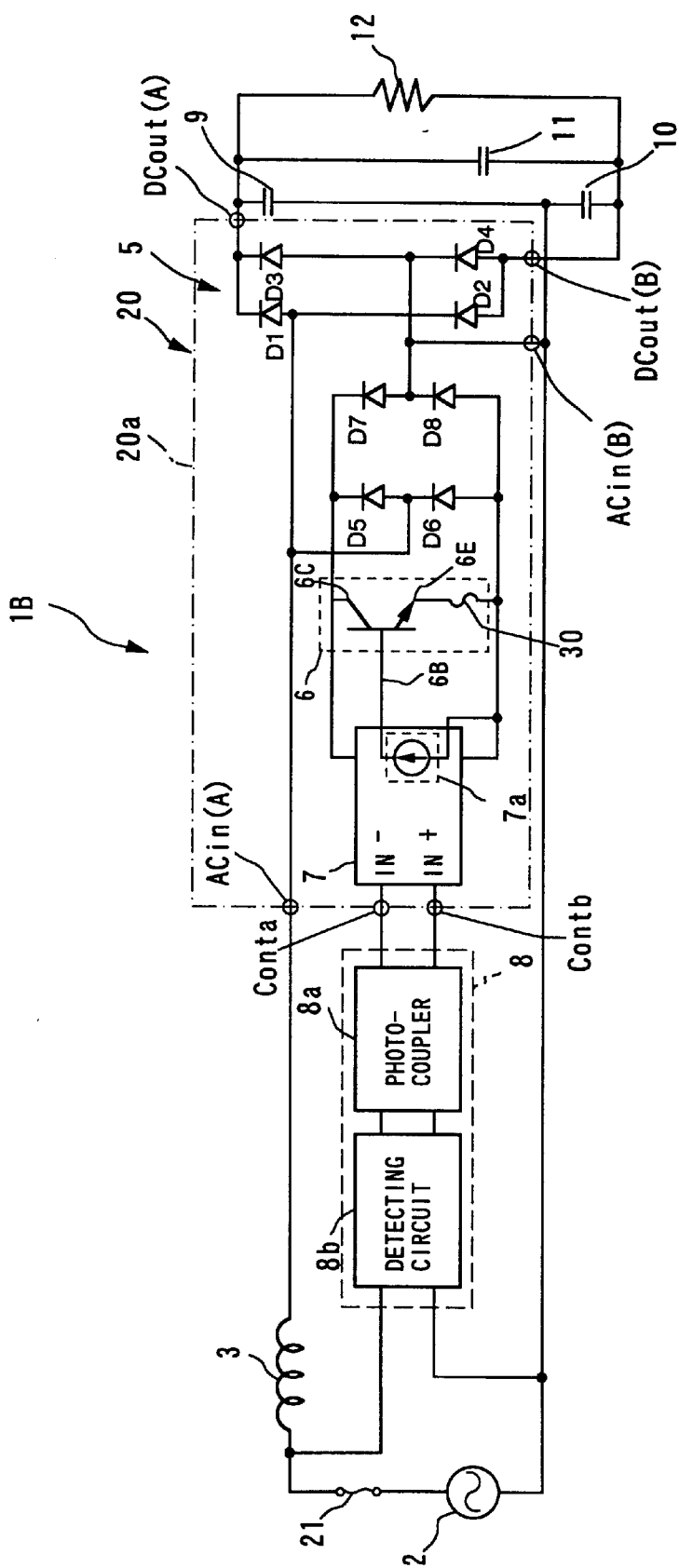
FIG. 3 is an electronic circuit diagram showing a DC power supply system according to a third embodiment of the present invention.

FIG. 3 is an electronic circuit diagram showing a DC power supply system 1B according to a third embodiment of the invention.

This DC power supply system 1B of this embodiment has an inside conductor, such as a bonding wire connected to the emitter 6E for causing the current to flow through the emitter 6E to the first diode bridge circuit 4 and a fuse 30 formed at a portion of the bonding wire. The DC power supply system 1B of this embodiment has no use of the sub-fuse 15 and the one short circuit input terminal 26. The remaining components of the DC power supply system 1B of the third embodiment are substantially the same as corresponding components of the DC power supply system 1A of the second embodiment, respectively.

In this embodiment, in case switching element 6 gets out of order and the an eddy current flows through a side of the emitter 6E, the fuse 30 has burned out thereby preventing the first diode bridge circuit 4 from getting out of order.

Therefore, it is possible to omit the sub-fuse 22 and the one short circuit input terminal 26, as shown in FIG. 2, thereby more improving the efficiency of the assembly operation of the DC power supply system 1B.

Figure 4:
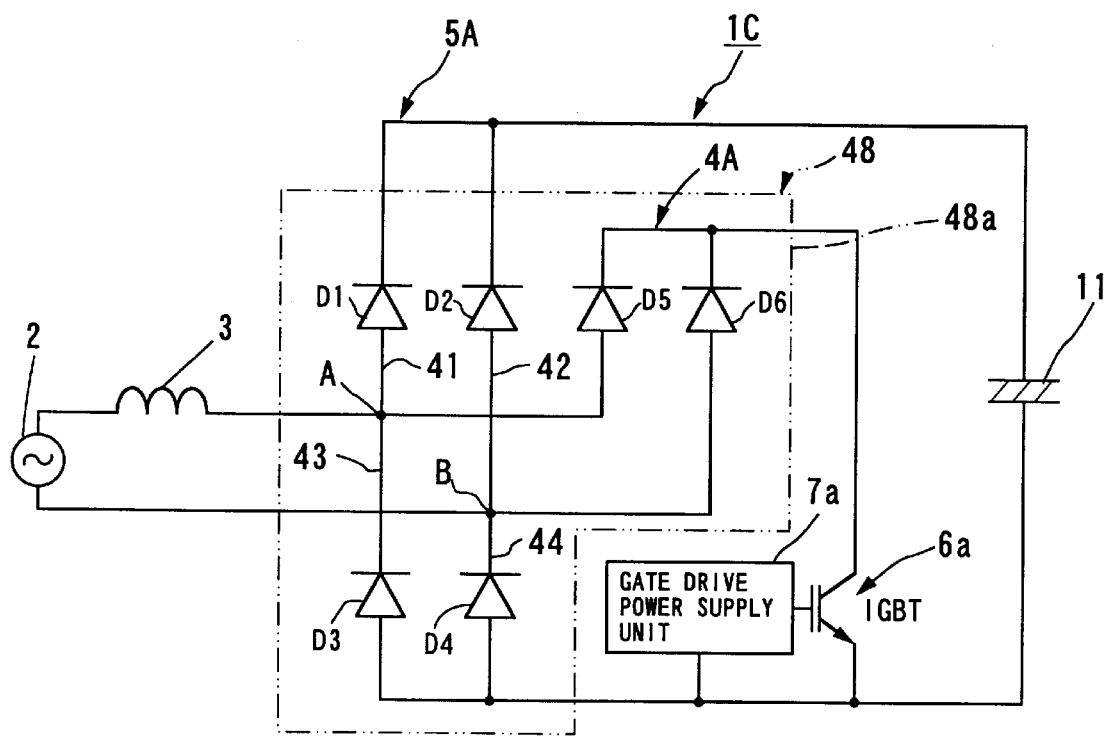
FIG. 4 is an electronic circuit diagram showing a DC power supply system according to a fourth embodiment of the present invention.
Figure 7:
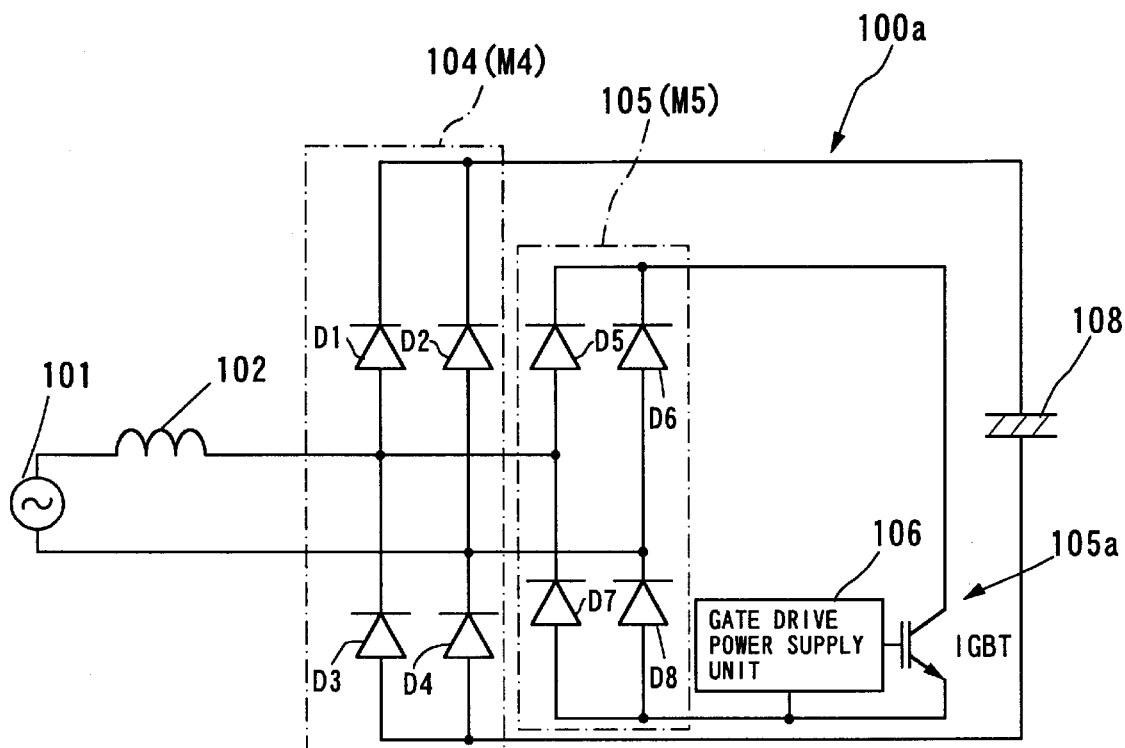
FIG. 7 is an electronic circuit diagram showing another example of a conventional DC power supply system.
Figure 8:
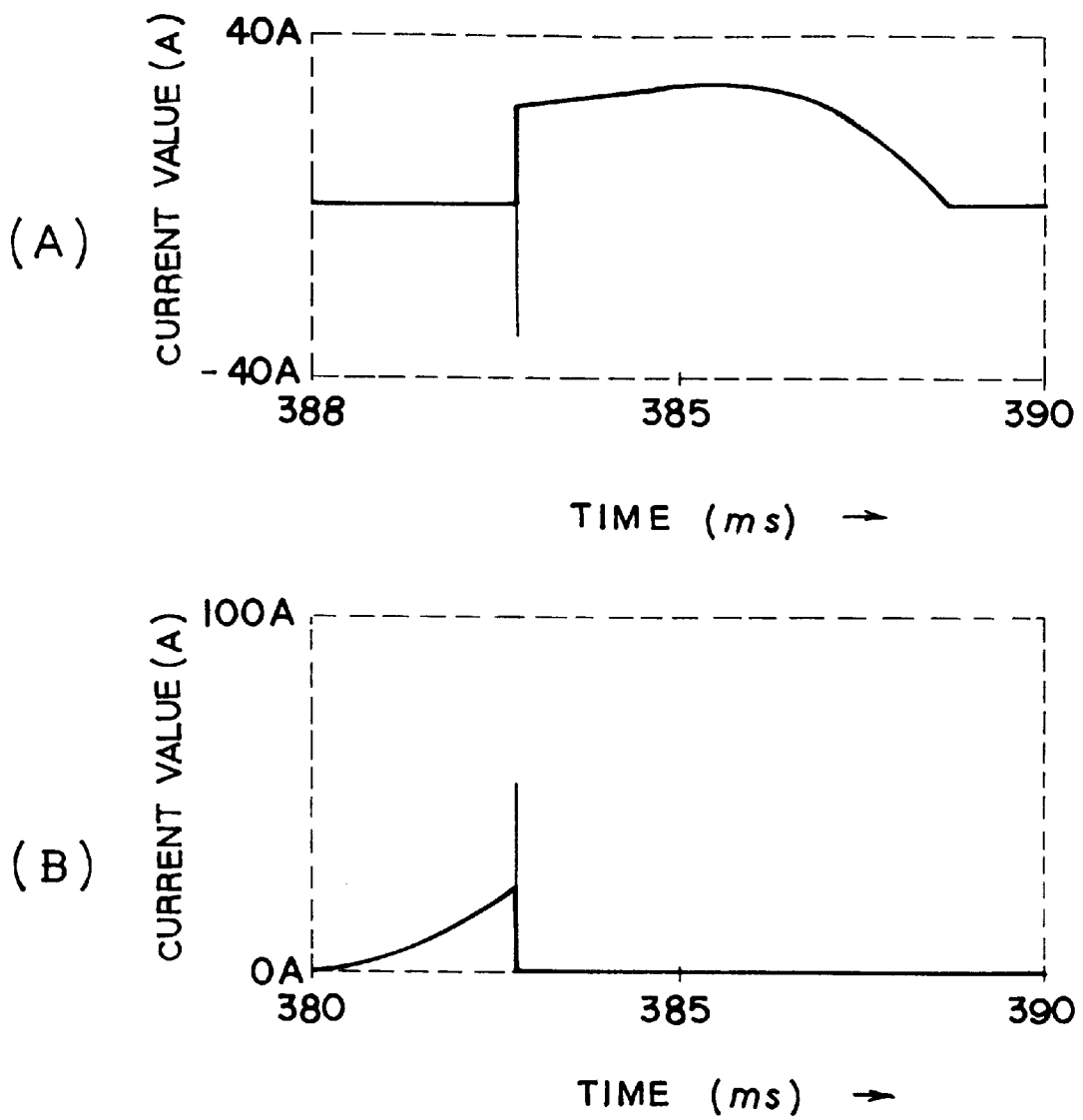
FIG. 8(A) is a wave form chart showing a current value of the discontinuous current flowing through the side of the second diode bridge circuit in FIGS. 6 and 7.
FIG. 8(B) is a wave form chart showing a current value of the discontinuous current flowing through the side of the first diode bridge circuit in FIGS. 6 and 7.
Figure 9:
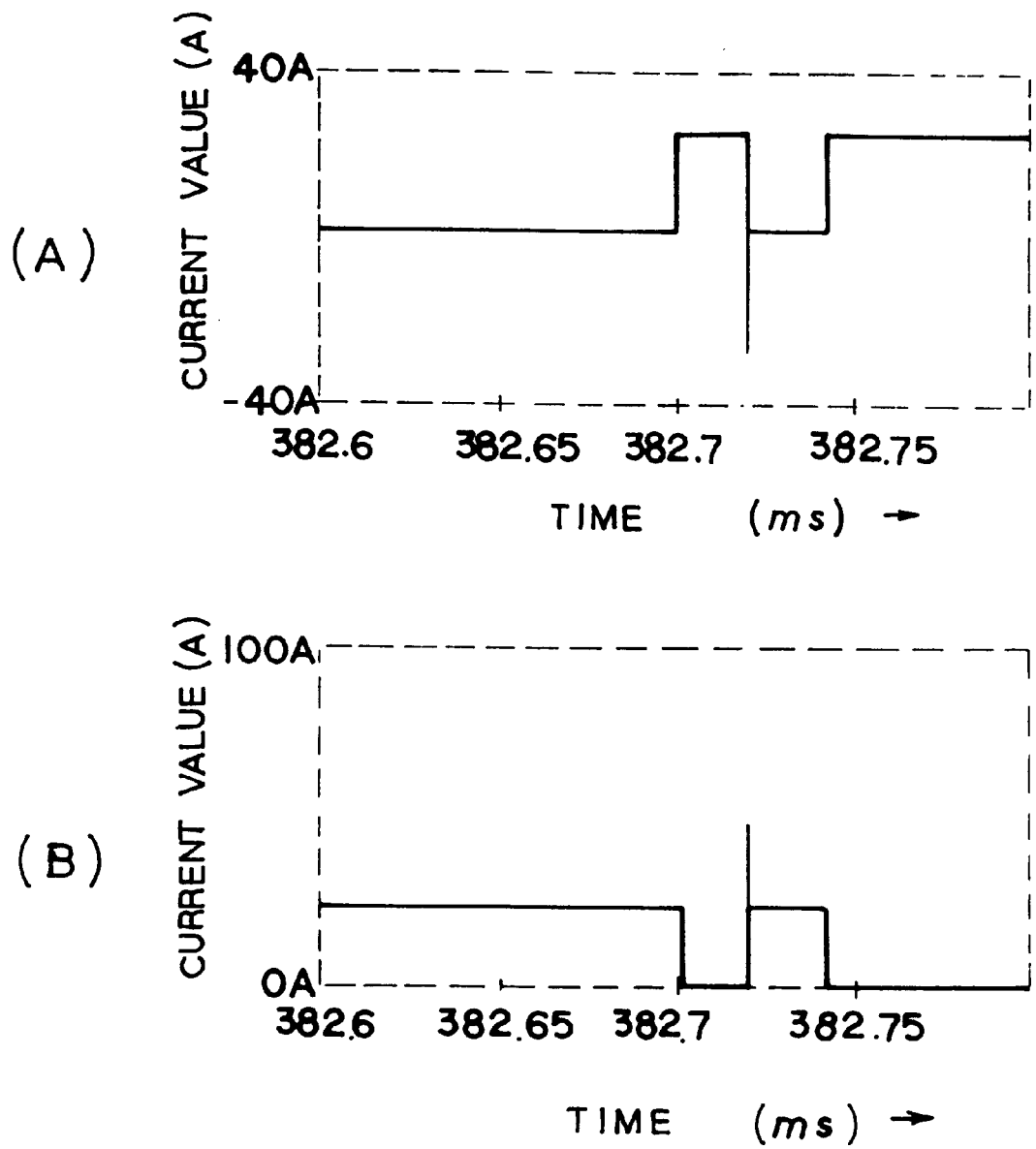
FIG. 9(A) is an enlarged wave form chart showing a current value of the discontinuous current in FIG. 8(A) flowing close to the first diode bride in FIGS. 6 and 7.
FIG. 9(B) is an enlarged wave form chart showing a current value of the discontinuous current in FIG. 8(B) flowing close to the first diode bride in FIGS. 6 and 7.

FIG. 4 is an electronic circuit diagram showing a DC power supply system 1C according to a fourth embodiment of the invention. This DC power supply system 1D has the third diode D3 and the fourth diode D4 of the rectifier circuit (second diode bridge circuit) 5A, which are used both as the seventh diode D7 and the eighth diode D8 of the short circuit (first diode bridge circuit) 4A thereby omitting the seventh diode D7 and the eighth diode D8. The remaining components of the DC power supply system 1C of the fourth embodiment are substantially the same as corresponding components of the DC power supply system 100a of the conventional DC power supply system 100a as shown in FIG. 7.

In the DC power supply system 1C, as shown in FIG. 4, the first diode bridge circuit consisting of the short circuit 4A is adapted to make the IGBT consisting of the switching element 6a control so that the IGBT 6a is gated on and off by a gate driver power supply unit 7a consisting of the control means and a drive unit (gate drive power supply unit). In addition, the gate drive power supply unit 7a is connected to gate terminals of a transistor bridge circuit of an inverter circuit 48, which is used with the DC power supply system 1C, so as to drive the transistor bridge circuit thereof.

Moreover, anode side terminals of the third and fourth diodes D3, D4 of the short circuit 4A are connected to cathode side output ends of the rectifier circuit 5A and cathode side terminals 43, 44 of the third and fourth diodes D3, D4 are connected to anode side terminals 41, 42 of the first and second diodes D1, D2 of the rectifier circuit 5A. In addition, the cathode side terminals 43, 44 of the third and fourth diodes D3, D4 are also connected to the cathode side terminals of the fifth and sixth diodes D5, D6 of the short circuit 4A so that the third and fourth diodes D3, D4 are also used as the seventh and eighth diodes D7, D8 of the short circuit 4A thereby omitting the seventh and eighth diodes.

Furthermore, an input side of the gate driver power supply unit 7a and an emitter side (a source side) of the IGBT 6a are electrically connected to the cathode side output ends of the rectifier circuit 5A.

That is, the input side of the gate drive power supply unit 7a and the emitter side of the IGBT 6a are electrically connected to the anode side terminals of the third and fourth diodes D3, D4.

In this DC power supply system 1C, when the IGBT 6a is gated ON by the gate driver power supply unit 7a, in the case where a plus voltage of the alternating current voltage of the AC power supply 2 is applied to the anode side common terminal 41 of the diode D1 and the diode D5, that is, point A in FIG. 4 gets to be an anode, the AC supplied from the AC power supply 2 flows through the reactor 3 so as to be divided into the first diode D1 and the fifth diode D5. The divided AC into the first diode D1 is smoothed by the smoothing capacitor 11. On the other hand, the divided AC into the fifth diode D5, still more, flows through the IGBT 6a, the fourth diode D4 and the AC power supply 2 (the IGBT6a→the fourth diode D4→the AC power supply 2). As a result of that, the output ends of the AC power supply 2 are short-circuited through the reactor 3 so that the AC is forced to flow through the reactor 3 thereby efficiently storing energy in the reactor 3. Therefore, it is possible to improve the power factor of the DC power supply system 1C and to reduce the higher harmonic ingredient.

When the IGBT 6a is gated ON by the gate driver power supply unit 7a, in the case where a minus voltage of the alternating current voltage of the AC power supply 2 is applied to the anode side common terminal 41 of the first diode D1 and the fifth diode D5, that is, point A in FIG. 4 gets to be a cathode and point B in FIG. 4 gets to be an anode, the AC supplied from the AC power supply 2 flows so as to be divided into the second diode D2 and the sixth diode D6. The divided AC into the second diode bridge D2 flows through the smoothing capacitor 11 and the third diode D3 (the smoothing capacitor 11→the third diode D3). On the other hand, the divided AC into the sixth diode D6, still more, flows through the IGBT 6a, the third diode D3, the reactor 3 and the AC power supply 2 (the IGBT 6a→the third diode D3→the reactor 3→the AC power supply 2), whereby both output ends of the AC power supply 2 are short-circuited through the reactor 3.

When the IGBT 6a is gated OFF and A point in FIG. 4 gets to be an anode, the AC supplied from the AC power supply 2 flows through the reactor 3 and, still more, flows through the first diode D1, the smoothing capacitor 11 and the fourth common diode D4 (the first diode D1→the smoothing capacitor 11→the fourth common diode D4).

Moreover, when the IGBT 6a is gated OFF and point B in FIG. 4 gets to be an anode, the AC supplied from the AC power supply 2 flows through the second diode D2, the smoothing capacitor 11, the third diode D3 and the reactor 3 (the second diode D2→the smoothing capacitor 11→the third diode D3→the reactor 3).

Therefore, in this embodiment, since the third and fourth diodes D3, D4 are commonly used as the seventh and eighth diodes D7, D8, the seventh and eighth diodes are omitted so that the total number of the diodes, which is six diodes, are reduced as compared with that of the conventional DC power supply system 100a, which are eight diodes. This leads to simplifying the composition of the DC power supply system 1C and to reduce the cost thereof.

Furthermore, in this DC power supply system 1C, since the emitter side of the IGBT 6a is connected to the cathode side output ends of the rectifier circuit 5A, as the drive power supply unit of the IGBT 6a, it is possible to commonly use the gate drive power supply unit 7a for driving the transistor bridge circuit of the inverter circuit 48. Therefore, it is possible to reduce the number of the power units of the electronic circuit having at least the DC power supply system 1C and the inverter circuit 48, which is one, as compared with that of an electronic circuit having the conventional DC power supply system 100a and an inverter circuit, thereby simplifying the composition of the electronic circuit and reducing the cost thereof.

Moreover, as a modification of this embodiment, it is possible to package the short circuit 4A and the rectifier circuit 5A in one package 48a so that the short circuit 4A and the rectifier circuit 5A are integrated into one semiconductor module 48.

Figure 5:
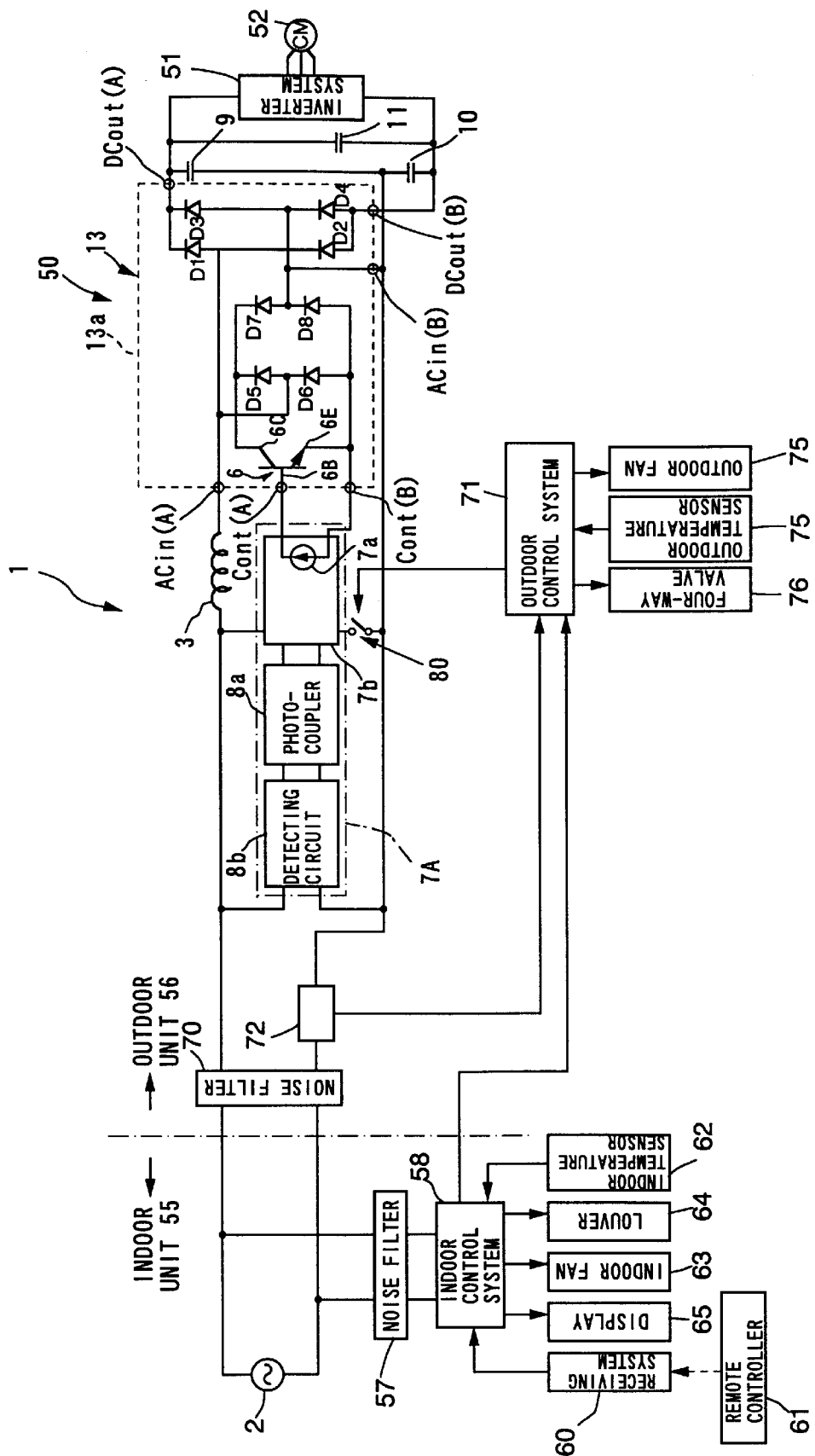
FIG. 5 is a block diagram showing an air conditioner having the DC power supply unit according to the present invention.

In this modification, it is possible to miniaturizing the DC power supply system 1C and to make the DC power supply system 1C light weight. FIG. 5 is an electronic circuit diagram of an air conditioner to which one of the DC power supply system 1, 1A, 1B and 1C applies according to a fifth embodiment of the invention. For example, in this embodiment, the DC power supply system 1 is applied to the air conditioner. This air conditioner 50 of this embodiment comprises the DC power supply system 1 as a converter system for converting the AC into the DC and an inverter system 51 for converting the DC outputted from the DC power supply system 1 into a variable AC having a variable voltage and variable frequency so as to supply the variable AC to a compressor motor (CM) 52. In the DC power supply system 1 shown in FIG. 5, instead of the load resistance 12, the second diode bridge circuit 5 is connected through the Inverter system 51 to the compressor motor 52.

This air conditioner 50 includes an indoor unit 55 and an outdoor unit 56 and is so constructed as to connect the indoor unit 55 to the AC power supply 2. In this indoor unit 55, the AC power supply 2 is adapted to supply a driving power through a noise reduction filter (noise filter) 57 to a indoor control system 58 thereof. To the indoor control system 58, receiving system 60 for receiving a command transmitted from a remote controller 61, an indoor temperature sensor 62 for detecting a room temperature and an indoor fan 63 for circulating air through an indoor heat exchanger, which is not shown in FIG. 5, in the room are connected, respectively. In addition, a louver 64 for changing a direction of air blown out into the room and a display 65 for displaying an operation mode of the air conditioner 50 are connected to the indoor control system 58, respectively.

On the other hand, in the outdoor unit 56, the AC power supply 2 is adapted to supply a driving power through a noise reduction filter (noise filter) 70 to an outdoor control system 71 and the compressor motor 52. In this case, at a load side of the noise reduction filter 70, a current value detecting circuit 72 is arranged. A detecting signal by the current value detecting circuit 72 is inputted to the outdoor control system 71.

Moreover, in the DC power supply system 1 shown in FIG. 5, the control means 7A has a control circuit 7b including the drive power supply unit 7a for supplying the power-factor improvement pulse and the noise reduction pulse. The control means 7A also has the zero-crossing detecting means 8 including the photocoupler 8a and the detecting circuit 8b for detecting the zero-crossing point.

To the outdoor control system 71, an outdoor temperature sensor 75 for detecting an outdoor heat exchanger sensor, a four-way valve 76 for changing a circulating direction of a refrigerant according to the operation mode and an outdoor fan 77 for supplying air into the outdoor heat exchanger are connected, respectively.

Moreover, the outdoor control system 71 is adapted to control the inverter system 51 while transmitting control signals to the indoor control and receiving control signals therefrom, and to control a relay 80, which is operative to switch the control means 7A on or off.

Next, a substantial operation of the air conditioner 50 having the above construction according to this embodiment will now be described.

At first, the command data, such as a start of the operation, the operation mode, a set temperature in the room, a fan speed of the indoor fan 63, the direction of air blow and so on, transmitted from the remote controller 61 is received through the receiving system 60 to the indoor control system 58. The indoor control system 58 displays the operation mode and so on in the display 65 and operates a driving control of the indoor fan 63 and the louver 64. The indoor control system 58 also calculates a power supply-frequency (referred to a "compressor frequency", hereinafter) for driving the compressor motor 52 according to a gap between the set temperature and the room temperature so as to transmit the compressor frequency calculated thereby to the outdoor control system 71 together with the operation mode. The outdoor control system 71 makes the four-way valve 76 exciting (or non-exciting) based on the operation mode, controls the inverter system 51 in accordance with the compressor frequency and drives the outdoor fan 77 so as to execute an air conditioning operation. Moreover, the outdoor control system 71 controls the four-way valve 76 in response to the detecting signal transmitted from the outdoor temperature sensor 75 provided at the outdoor heat exchanger so as to execute a defrosting operation.

In addition, when the current value detected by the detecting circuit 72 is over with respect to the set current value previously set by the outdoor control system 71, the outdoor control system 71 makes the relay 80, which is arranged to an input line of the control means 7A, switch on so that the control means 7A executes a forcibly energizing control in that the AC supplied through the noise reduction filter 72 from the AC power supply 2 is forced to flow through the reactor 3, described above.

By executing the forcibly energizing control of the control means 7A, it is possible to reduce the higher harmonic ingredient and to improve the power factor of the DC power supply system 1. Simultaneously, when the current value detected by the detecting circuit 72 has just passed through the set current value, the control means 7A adjusts a phase section of the forcibly energizing control with respect to the reactor 3 so as to supply more power within a limited value to the compressor motor 52.

As described above, when using the DC power supply system of the present invention, for example, the DC power supply system 1, in the air conditioner, it is possible to miniaturize the DC power supply system for driving the compressor motor and the whole of the air conditioner and to make the DC power supply system for driving the compressor motor and the whole of the air conditioner light weight.

In addition, in each of the embodiments, the control means has the drive power supply unit. However, the present invention is not limited to the above structure but may apply to a structure in that the drive power supply unit is arranged to an outside of the control means.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A direct-current power supply system comprising:

an alternating current power supply for outputting an alternating current;

rectification means for converting the alternating current outputted from the alternating current power supply into a direct current; i smoothing means for smoothing the direct current outputted from the rectification means;

a reactor inserted into an input side of the rectification means in series;

zero-crossing detecting means operatively connected to the alternating current power supply for detecting a zero-crossing point at which an alternating current volt of the alternating current power supply has just passed through a zero point;

control means having a switching element, when the zero-crossing point is detected by the zero-crossing detecting means, adapted to firstly switch the switching element on for a first predetermined period of time and, after a predetermined delay period of time has passed since the switching element is firstly switched on, adapted to secondly switch the switching element on for a second predetermined period of time, said second predetermined period of time being shorter than the first predetermined period of time;

short circuit means, while the switching element is firstly and secondly switched on, adapted to short-circuit the alternating current power supply through the reactor so that the alternating current is forced to flow through the reactor; and one package for packaging at least said rectification means, said short circuit means and said switching element therein so that at least said rectification means, said short circuit means and said switching means are integrated into the one package as one semiconductor module.

2. A direct-current power supply system according to claim 1, wherein said one semiconductor module has two alternating current input terminals connected to two output end of the alternating current power supply, two direct current output terminals connected to the smoothing circuit and two control signal input terminals connected to the control means.

3. A direct-current power supply system according to claim 1, wherein whole of said control means is integrated into the one semiconductor module.

4. A direct-current power supply system according to claim 3, wherein said one semiconductor module has two alternating current input terminals connected to two output end of the alternating current power supply, two direct current output terminals connected to the smoothing circuit and two detecting signal input terminals connected to the detecting means.

5. A direct-current power supply system according to claim 3, wherein said zero-crossing detecting means has a photocoupler and is connected through the photocoupler to an input side of the control means so that the control means is insulated from the zero-crossing means.

6. A direct-current power supply system according to claim 3, wherein said control means includes a drive power supply unit for driving the switching element.

7. A direct-current power supply system according to claim 3, wherein said semiconductor module has one short circuit input terminal for inputting the alternating current flowing through the reactor to the short circuit means and said reactor has one terminal connected to one output end of the alternating current power supply and other terminal, and further comprising a fuse inserted between the one short circuit input terminal of the semiconductor module and the other terminal of the reactor.

8. A direct-current power supply system according to claim 7, wherein said fuse has a first rated current value, and further comprising a fuse element inserted between the one output end of the alternating current power supply and the one terminal of the reactor and having a second rated current value, said second rated current value of the fuse element being larger than the first rated current value of the fuse.

9. A direct-current power supply system according to claim 3, wherein said switching element has an inside conductor and a fuse formed on at least one portion of the inside conductor.

10. A direct-current power supply system according to claim 9, wherein said inside conductor is a bonding wire for causing the alternating current to flow through the switching element to the short circuit means.

11. A direct-current power supply system according to claim 8, further comprising a fuse element inserted between the one output end of the alternating current power supply and the one terminal of the reactor.

12. A direct-current power supply system comprising:

an alternating current power supply for outputting an alternating current;

rectification means having a diode bridge unit including a diode for converting the alternating current outputted from the alternating current power supply into a direct current by the diode bridge unit;

smoothing means for smoothing the direct current outputted from the rectification means;

a reactor inserted into an input side of the rectification means in series;

zero-crossing detecting means operatively connected to the alternating current power supply for detecting a zero-crossing point at which an alternating current volt of the alternating current power supply has just passed through a zero point;

control means having a switching element, when the zero-crossing point is detected by the zero-crossing detecting means, adapted to firstly switch the switching element on for a first predetermined period of time and, after a predetermined delay period of time has passed since the switching element is firstly switched on, adapted to secondly switch the switching element on for a second predetermined period of time, said second predetermined period of time being shorter than the first predetermined period of time; and short circuit means having a diode bridge circuit including a diode, while the switching element is firstly and secondly switched on, adapted to short-circuit the alternating current power supply through the reactor and the diode bridge circuit so that the alternating current is forced to flow through the reactor, wherein said diode of the diode bridge circuit of the short circuit means is adapted to be commonly used as the diode of the diode bridge unit of the rectification means.

13. A direct-current power supply system according to claim 12, wherein said diode bridge circuit has four diodes, said diode bridge unit has two diodes, and wherein said commonly used diode of the diode bridge circuit is two diodes of the diode bridge circuit and has cathode side terminals, said cathode side terminals of the two commonly used diodes being commonly connected to anode side terminals of other two diodes of the diode bridge circuit and to anode side terminals of two diodes of the diode bridge unit, respectively.

14. A direct-current power supply system according to claim 13, further comprising a drive power supply unit connected to the anode side terminals of the two commonly used diodes for driving an inverter circuit, said drive power supply unit being commonly used as a drive power supply for driving the switching element.

15. A direct-current power supply system according to claim 12, further comprising one package for packaging at least said rectification means and said short circuit means therein so that at least said rectification means and said short circuit means are integrated into the one package as one semiconductor module.

16. An air conditioner having a compressor and a compressor motor for driving the compressor for executing an air conditioning operation according to a drive of the compressor; the air conditioner comprising:

converter means for converting an alternating current into a direct current; and inverter means for converting the direct current converted by the converter means into a variable alternating current having a variable voltage and a variable frequency so as to supply the variable alternating current to the compressor motor, wherein said converter means comprises:

an alternating current power supply for outputting the alternating current;

rectification means for converting the alternating current outputted from the alternating current power supply into the direct current;

smoothing means for smoothing the direct current outputted from the rectification means so as to transmit the smoothed direct current to the inverter means;

a reactor inserted into an input side of the rectification means in series;

zero-crossing detecting means operatively connected to the alternating current power supply for detecting a zero-crossing point at which an alternating current volt of the alternating current power supply has just passed through a zero point;

control means having a switching element, when the zero-crossing point is detected by the zero-crossing detecting means, adapted to firstly switch the switching element on for a first predetermined period of time and, after a predetermined delay period of time has passed since the switching element is firstly switched on, adapted to secondly switch the switching element on for a second predetermined period of time, said second predetermined period of time being shorter than the first predetermined period of time;

short circuit means, while the switching element is firstly and secondly switched on, adapted to short-circuit the alternating current power supply through the reactor so that the alternating current is forced to flow through the reactor; and one package for packaging at least said rectification means, said short circuit means and said switching element therein so that at least said rectification means, said short circuit means and said switching means are integrated into the one package as one semiconductor module.

17. An air conditioner having a compressor and a compressor motor for driving the compressor for executing an air conditioning operation according to a drive of the compressor; the air conditioner comprising:

converter means for converting an alternating current into a direct current; and inverter means for converting the direct current converted by the converter means into a variable alternating current having a variable voltage and a variable frequency so as to supply the variable alternating current to the compressor motor, wherein said converter means comprises:

an alternating current power supply for outputting the alternating current;

rectification means having a diode bridge unit including a diode for converting the alternating current outputted from the alternating current power supply into a direct current by the diode bridge unit;

smoothing means for smoothing the direct current outputted from the rectification means so as to transmit the smoothed direct current to the inverter means;

a reactor inserted into an input side of the rectification means in series;

zero-crossing detecting means operatively connected to the alternating current power supply for detecting a zero-crossing point at which an alternating current volt of the alternating current power supply has just passed through a zero point;

control means having a switching element, when the zero-crossing point is detected by the zero-crossing detecting means, adapted to firstly switch the switching element on for a first predetermined period of time and, after a predetermined delay period of time has passed since the switching element is firstly switched on, adapted to secondly switch the switching element on for a second predetermined period of time, said second predetermined period of time being shorter than the first predetermined period of time; and short circuit means having a diode bridge circuit including a diode, while the switching element is firstly and secondly switched on, adapted to short-circuit the alternating current power supply through the reactor and the diode bridge circuit so that the alternating current is forced to flow through the reactor, said diode of the diode bridge circuit of the short circuit means being adapted to be commonly used as the diode of the diode bridge unit of the rectification means.

* * * * *